United States Patent [19]
Couvillion et al.

[11] Patent Number: 5,221,060
[45] Date of Patent: Jun. 22, 1993

[54] THERMAL EXPANSION COMPENSATED WINDING OF OPTICAL FIBER CANISTERS

[75] Inventors: Albert J. Couvillion, Desoto, Tex.; Ronald N. Hopkins, Tucson, Ariz.

[73] Assignee: Hughes Aircraft Company, Los Angeles, Calif.

[21] Appl. No.: 929,355

[22] Filed: Aug. 14, 1992

[51] Int. Cl.$^5$ .................. B65H 55/00; B65H 55/04
[52] U.S. Cl. .................... 242/159; 242/47; 242/176
[58] Field of Search .............. 242/159, 174, 176, 177, 242/178, 25 R, 47, 117

[56] References Cited

U.S. PATENT DOCUMENTS

| | | | |
|---|---|---|---|
| 3,610,549 | 10/1971 | Wennerstrom et al. | 242/176 |
| 4,354,645 | 10/1982 | Glavas et al. | 242/117 |
| 4,746,080 | 5/1988 | Pinson | 242/159 |
| 4,961,545 | 10/1990 | LeCompte | 242/159 |
| 5,029,960 | 7/1991 | Hulderman et al. | 242/159 X |
| 5,154,366 | 10/1992 | Le Compte | 242/159 |

Primary Examiner—Stanley N. Gilreath
Attorney, Agent, or Firm—Randall M. Heald; Charles D. Brown; Wanda K. Denson-Low

[57] ABSTRACT

An optical fiber canister (20) is formed of a bobbin (22) having an optical fiber (24) wound in a plurality of layers. The optical fiber layers include a first layer (42) having a plurality of spaced-apart helical wound segments (44), with each pair of helical wound segments (44) being separated by a stepforward wound segment (46). A second layer (50) overlies the first layer (42), the second layer (50) comprising a plurality of spaced-apart helical wound segments (52), with each pair of helical wound segments (52) being separated by a stepforward wound segment (54). The first and second layers (42 and 50) are wound such that the stepforward wound segments (54) of the second layer (50) overlie the helical wound segments (44) of the first layer (42), and the helical wound segments (52) of the second layer (50) overlie the stepforward wound segments (46) of the first layer (42).

17 Claims, 3 Drawing Sheets

THERMAL EXPANSION COMPENSATED WINDING OF OPTICAL FIBER CANISTERS

BACKGROUND OF THE INVENTION

This invention relates to optical fibers, and, more particularly, to the winding of an optical fiber pack upon a bobbin so as to improve the thermal stability of the optical fiber pack.

Optical fibers are strands of glass fiber processed so that light transmitted therethrough is subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried along the optical fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer is about 250 micrometers (approximately 0.010 inches).

For such very fine optical fibers, the handling of the optical fiber to avoid damage that might reduce its mechanical strength properties becomes an important consideration. In one approach, the optical fibers are wound onto a cylindrical or tapered cylindrical bobbin, generically termed a frustoconical bobbin, with many turns adjacent to each other in a side by side fashion. After one layer is complete, another layer of optical fiber is laid on top of the first layer, and so on. A weak adhesive is typically applied to the layers of optical fiber, to hold them in place. The final assembly of the bobbin and the wound layers of optical fiber is termed a canister, and the mass of wound optical fiber is termed the fiber pack. When the optical fiber is later to be used, the fiber is paid out from the canister in a direction parallel to the axis of the bobbin.

The canisters must sometimes be stored for extensive periods of time at extreme conditions. In one important application, the canisters are used in optical fiber-guided missiles. The missiles must be storable at low or high temperatures, and then immediately operable upon demand in the very low temperatures found at high elevations or in the high temperatures found in desert conditions. Procurement specifications for missiles reflect this requirement for storability and operability through temperature extremes. In one example, a missile must be storable and operable at temperatures ranging from −40° C. to +55° C.

When the optical fiber canister is heated and cooled at various times in testing, storage, or service, the optical fiber pack may degrade due to the thermal expansion difference between the optical fiber pack and the bobbin upon which it is wound. The optical fiber pack expands by different amounts in the axial and circumferential directions. In the axial direction, the thermal expansion coefficient of the optical fiber pack is dominated by that of the buffer material, and is relatively large. In the circumferential direction, the thermal expansion coefficient of the optical fiber pack is dominated by that of the glass, and is relatively small. Thus, there is typically a difference in either or both directions between that of the optical fiber pack and the bobbin.

Where there is a difference in thermal expansion between the optical fiber pack and the bobbin in any direction, there may develop folds, cracks, or other types of mechanical instabilities in the optical fiber pack during storage. Then, when the optical fiber is to be dispensed, the payout may be irregular so that the optical fiber may snarl. In extreme cases the optical fiber may break as a result of the instabilities created in the optical fiber pack due to the irregularities induced by the temperature changes, rendering the entire optical fiber and missile useless. Even one such fatal irregularity in thousands of meters of optical fiber is sufficient to cause such a failure. It is therefore important to take care to ensure that mechanical instability due to differences in thermal expansion is not present.

Thus, there is a need for an optical fiber canister which is not subject to formation of mechanical instabilities as a result of temperature changes during testing, storage, and use. This need is particularly acute for compact dispensers that are used to store and dispense very long lengths, typically many kilometers, of optical fiber. The present invention fulfills this need, and further provides related advantages.

SUMMARY OF THE INVENTION

The present invention provides a canister of improved thermal stability. Payout of the optical fiber remains good, and there is no increased cost of producing the canister. The approach is operable with canisters of varying configurations and constructions.

In accordance with the invention, an optical fiber canister is formed of a bobbin having an optical fiber wound in a plurality of layers. The optical fiber layers include a first layer having a plurality of spaced-apart helical wound segments, with each pair of helical wound segments being separated by a stepforward wound segment. A second layer overlies the first layer, the second layer having a plurality of spaced-apart helical wound segments, with each pair of helical wound segments being separated by a stepforward wound segment. The second layer is wound such that the stepforward wound segments of the second layer overlie the helical wound segments of the first layer, and the helical wound segments of the second layer overlie the stepforward wound segments of the first layer.

As used herein, a "helical wound segment" is a portion of the optical fiber wound around the bobbin with each turn lying adjacent to the prior turn, so that the optical fiber forms a helix whose pitch is about 100–103 percent of the diameter of the optical fiber. There are usually a number of turns of the optical fiber making up each helical wound segment. A "stepforward wound segment" is a portion of the optical fiber wound onto the bobbin in a spiral, with a high pitch relative to the axis of the bobbin. In a stepforward wound segment, the optical fiber is typically at an angle of from about 30 to about 60 degrees to the axis of the bobbin. Because of this high pitch, it is typical that the optical fiber in the stepforward wound segment extends less than 90 degrees circumferentially around the bobbin.

In the present approach, each layer of optical fiber can be visualized as a number of spaced apart helical wound segments, with each pair of helical wound segments separated by a stepforward wound segment. The stepforward wound segments are desirably staggered around the circumference of the bobbin, resulting in a symmetrical final layer. The next layer is similarly formed of spaced apart helical wound segments separated by stepforward wound segments, but preferably the next layer is wound so that its helical wound segments overlie the stepforward wound segments of the prior layer, to hold them securely in place, and the stepforward wound segments of the next layer overlie the helical wound segments of the prior layer. This alternating winding pattern holds the stepforward wound segments of each layer securely in place with the helical wound segments of the next layer.

This winding pattern has the important advantage that it tends to reduce the asymmetry of the thermal expansion of the optical fiber pack and to reduce the likelihood of thermal cycling damage to the optical fiber pack. The stepforward wound segments orient an angular component of the optical fiber in the direction parallel to the axis of the bobbin, reducing the thermal expansion of the optical fiber pack in that direction. These optical fibers also strengthen the optical fiber pack in the direction parallel to the axis of the bobbin, so that its strength is not dependent entirely upon the strength of the adhesive between the adjacent turns of each layer in the helical wound segments.

The result is that the optical fiber pack and the canister are more stable during storage and service, where extremes of temperature may be encountered. The improved stability means that there is reduced likelihood of a fissure or bulge forming in the optical fiber pack during storage, with the result that there is reduced likelihood that a payout irregularity will develop that might cause a snarl or break of the optical fiber. The present invention therefore improves the overall performance of the optical fiber canister by changing the winding pattern of the optical fiber, which does not increase the cost of the canister and may be used with any configuration of bobbin. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
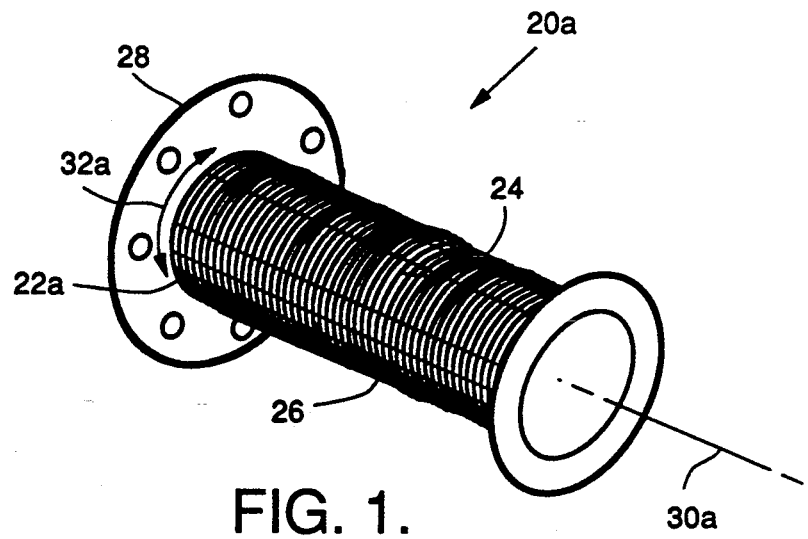
FIG. 1 is an optical fiber canister with a cylindrical bobbin.
Figure 2:
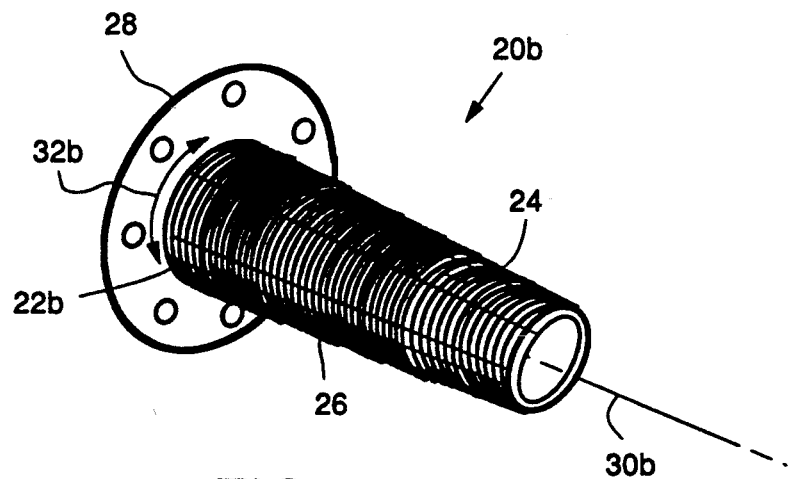
FIG. 2 is an optical fiber canister with a tapered conical bobbin.

The present invention provides an approach for winding an optical fiber onto a bobbin. FIGS. 1 and 2 illustrate two configurations of optical fiber canisters 20. Each has a bobbin 22 upon which an optical fiber 24 is wound. Generally, the optical fiber 22 is wound in a layer, and then subsequent layers are wound upon that layer, resulting in an optical fiber pack 26. The details of the winding arrangement will be discussed in greater detail subsequently. The bobbin 22 and fiber pack 26 together constitute the canister 20. One end of the bobbin 22 is fastened to a flange 28, which in turn can be fastened to a support structure in an aircraft, missile, or other location.

The canister 20a of FIG. 1 has a cylindrical bobbin 22a, with an axis 30a extending along the center of the cylinder. The canister 20b of FIG. 2 has a bobbin 22b that is tapered to form a frustum of a cone, with a conical taper of less than about 5 degrees. The bobbin 22b has an axis 30b extending along the center of the cone. In each case, there is an axial direction parallel to the axis 30a or 30b, and a circumferential direction 32a or 32b, lying in the plane of the bobbin and perpendicular to the axial direction 30a or 30b. The present invention is operable with either configuration of canister 20a or 20b, or with other configurations of canister.

Figure 3:
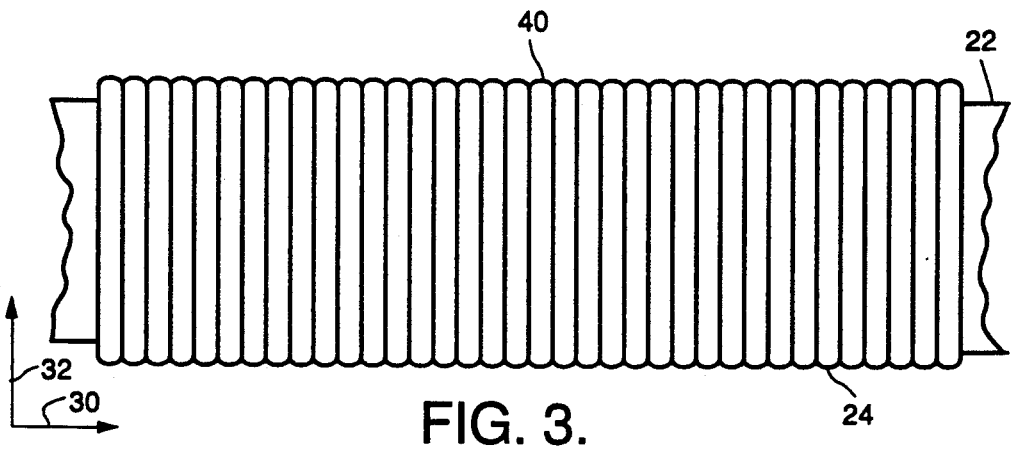
FIG. 3 is a plan view of a fiber pack wound on a bobbin, showing an underlying layer.

FIG. 3 is a plan view of an underlying layer 40 that is wound onto the bobbin 22. The term "underlying layer" is used generically herein, to mean a layer of any of several types. The underlying layer can be a base layer of a material having a diameter about the same as that of the optical fiber, wound directly onto the bobbin 22, which serves as a base for winding all subsequent layers. The base layer is in the form of a helix having a helical pitch about equal to the diameter of the optical fiber. The base layer is often made of a metallic wire such as steel wire. The underlying layer can also be other layers of optical fiber already wound onto the bobbin prior to the layers configured according to the present invention, as will be discussed in relation to FIGS. 4 and 5. These layers might be configured like those of FIGS. 4 and 5, or otherwise. Thus, the underlying layer 40 of FIG. 3 simply represents a base upon which the layer of FIG. 4 is wound.

Figure 4:
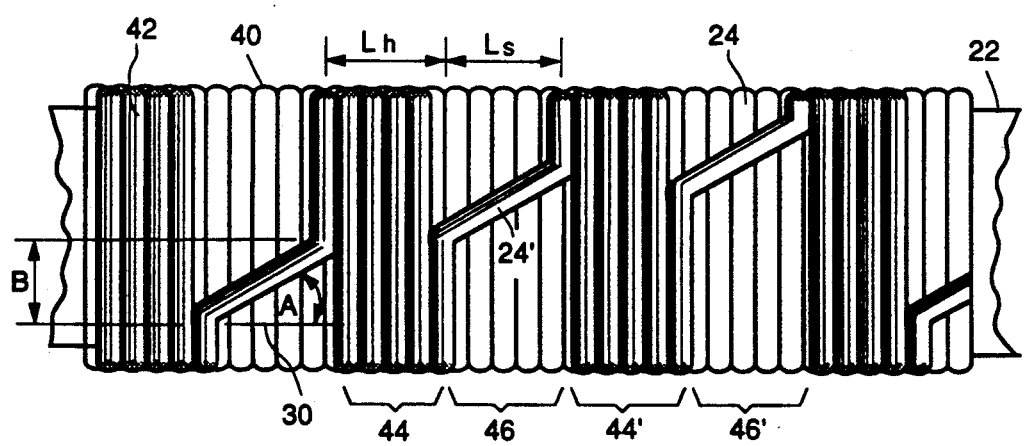
FIG. 4 is a plan view of the fiber pack wound on the bobbin of FIG. 3, showing a first layer wound upon the underlying layer.

FIG. 4 is a plan view of a first layer 42 wound upon the underlying layer 40, with the optical fiber 24 wound from left to right in the illustration. The first layer 42 is formed of two types of segments. A helical wound segment 44 is formed by winding the optical fiber 24 circumferentially around the bobbin, with a helical pitch of about 100–103 percent of the diameter of the optical fiber. The optical fiber 24 is therefore within a few degrees of being parallel to the circumferential direction 32. Alternatively stated, the optical fiber 24 lies at an angle to the axis 30 of the bobbin of about 85–90 degrees. There are at least several, and may be many, turns of optical fiber 24 in the helical wound segment 44, a turn being one complete wrap of the bobbin by the optical fiber 24. As illustrated, each helical wound segment 44 has a width Lh (which may be uniform or different along the length of the bobbin), and adjacent helical wound segments 44 and 44' are spaced apart with a gap Ls between adjacent helical wound segments 44.

A stepforward wound segment 46 is located between the adjacent helical wound segments 44. The stepforward wound segment 46 is a length of optical fiber which is placed at a smaller angle A to the axis 30 than is the optical fiber in the helical wound segment 44. The angle of the optical fiber 24' to the axis 30 in the stepforward wound segment 46 is preferably from about 30 to about 60 degrees. If the angle A is less than about 30 degrees, there is insufficient beneficial effect on the stability of the canister. If the angle A is more than about 60 degrees, it is difficult to wind the optical fiber and hold it in place on the bobbin, and the high bending at the transition between helical wound segments and stepforward wound segments could result in optical loss from the optical fiber. Because of the low angle A, the optical fiber in a stepforward wound segment 46 typically extends only a small angular displacement B around the circumference of the bobbin, the displacement B being a function of the angle A and the axial length Ls chosen for the stepforward wound segment 46. The position of the stepforward wound segment 46 is advanced around the circumference of the bobbin 22, as between adjacent stepforward wound segments 46 and 46'.

The stepforward wound segment 46 has an important function in stabilizing the canister 20. The length of optical fiber 24 that is within a stepforward wound segment 46 lies much closer to the axis 30 than does the length of optical fiber 24 that is within a helical wound segment 44. Since the optical fiber has a relatively low coefficient of thermal expansion along its length, the stepforward wound segment imparts a component of low thermal expansion coefficient to the axial direction 30. By contrast, a helical wound segment 44 has a high coefficient of thermal expansion parallel to the axial direction 30, because its coefficient of thermal expansion is dominated by the high expansion coefficient of the buffer layer of the optical fiber. The stepforward wound segment 46 also supports the overlying helical segment wound upon it. Additionally, the optical fiber 24 is very strong parallel to its long direction, and the length of optical fiber 24 in the stepforward wound segment 46 imparts some of that strength to the axial direction 30 of the fiber pack 26.

By advancing the location of adjacent stepforward wound segment 46 around the circumference of the bobbin, as illustrated by comparing the segments 46 and 46', the contribution to thermal expansion and strength are made more symmetrical. The wound fiber pack formed in this manner has a high degree of quasi-symmetry when viewed as a unit, because there are typically tens of layers with the positions of the stepforward wound segments distributed around the circumference and along the length of the optical fiber pack.

Figure 6:
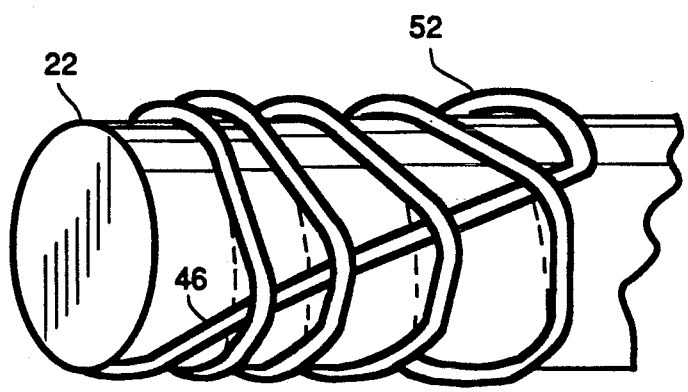
FIG. 6 is a perspective view of a detail of the structure illustrated in FIG. 5.
Figure 5:
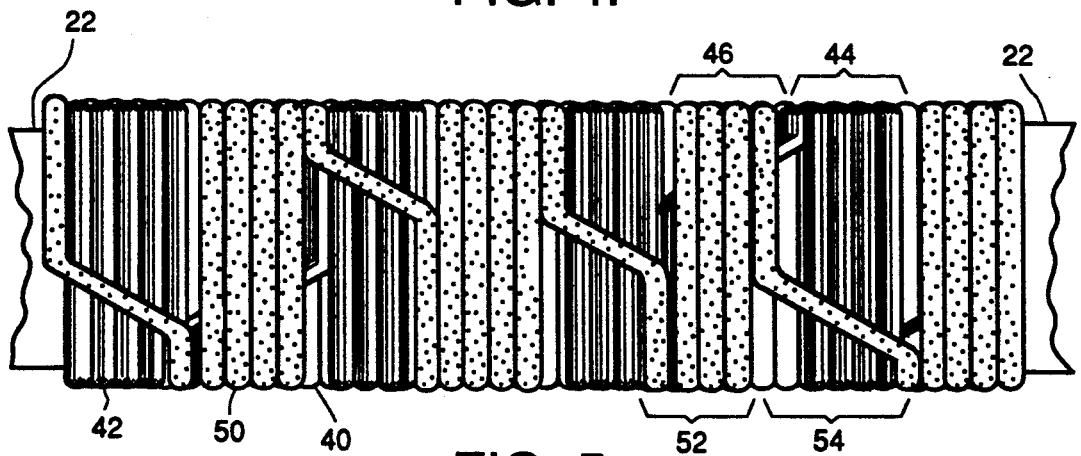
FIG. 5 is a plan view of the fiber pack wound on the bobbin of FIG. 4, showing a second layer wound upon the first layer and the underlying layer.

FIG. 5 illustrates a second layer 50 wound upon the first layer 52, from right to left in the selected illustration. The winding is accomplished such that a helical wound segment 52 of the second layer 50 overlies a stepforward wound segment 46 of the first layer 42, and such that a stepforward wound segment 54 of the second layer 50 overlies a helical wound segment 44 of the first layer 42. The overlying relation of the helical wound segment 52 of the second layer 50 and the stepforward wound segment 46 of the first layer 42 is further illustrated in the perspective view of FIG. 6, where the second layer is schematically illustrated with smaller diameter optical fibers and as loosely wound so that the underlying stepforward wound segment 46 can be seen more clearly.

This alternating form of winding the layers utilizes the helical wound segment 52 of the second layer 50 to securely hold in place the stepforward wound segment 46 of the first layer 42. The next layer wound overlying the second layer 50 would be wound such that its helical wound segments hold the stepforward wound segments of the second layer in place. Since the overlying layers are payed out first during deployment of the optical fiber, removal of each layer exposes the next layer down to payout.

Figure 7:
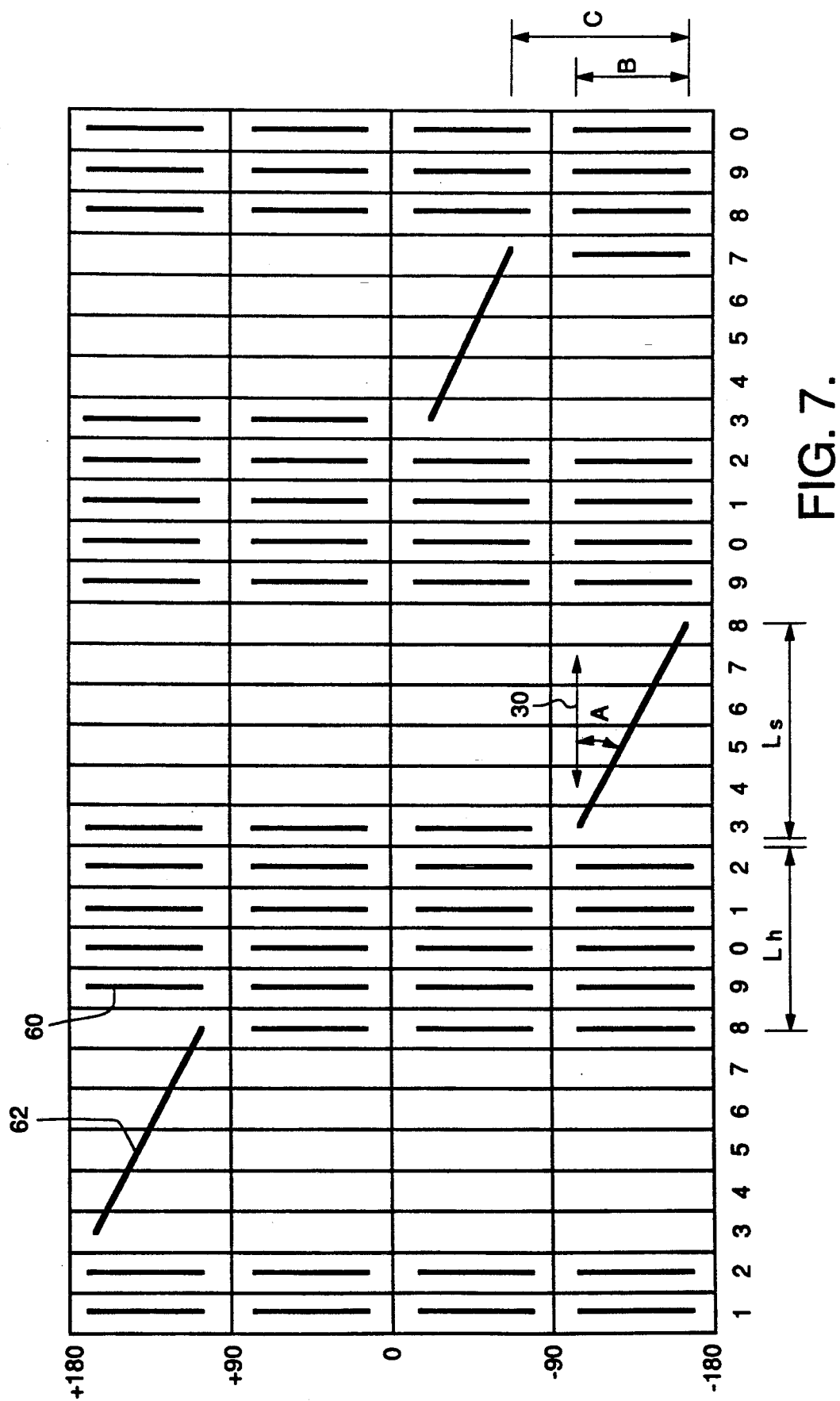
FIG. 7 is a winding diagram for a layer of optical fiber.

The present approach provides the designer of the canister great flexibility in choosing the exact configuration of the segments 44 and 46, and their interrelation. A procedure for specifying the winding patterns has been developed and is illustrated in FIG. 7. This illustration also aids in depicting the geometry of the winding in greater detail.

FIG. 7 is a winding pattern for a layer wound from left to right, and for a portion of the first layer 42 of FIG. 4. The winding pattern corresponds to cutting the bobbin and fiber pack along a line parallel to the axis 30, and flattening it out on a flat surface, the plane of the illustration. Angular positions around the circumference of the bobbin are marked. A vertical line such as the line 60 indicates a helical wound length of optical fiber, while an inclined line such as the line 62 indicates a stepforward wound length of optical fiber. The winding pattern utilizes a grid pattern upon which the lines 60 and 62 are superimposed, which grid pattern may be compared to the underlying layer 40 of FIG. 3—it is a substrate upon which the layer being depicted is wound.

In the winding diagram of FIG. 7, the parameters Lh, Ls, A, and B, discussed previously, are readily indicated and depicted. A circumferential offset C between the stepforward wound segments is about 90 degrees, but it could be more or less.

Calculations were performed to assess the effect of the approach of the invention on the thermal stability of the fiber pack and the canister. In the first calculation, the stress on the adhesive in a conventional, completely helically wound fiber pack was determined. In a typical case for a temperature excursion of 57° C., the axial stress that would be expected due to thermal expansion differences in the adhesive layer between the fibers was calculated to greatly exceed the yield stress of the adhesive. The result in a practical case would be that such a fiber pack would split apart as a result of the thermal expansion stresses.

A second calculation was performed for the case of alternating helical wound segments and stepforward wound segments, in the manner discussed for FIGS. 4–5. In this calculation, Lh and Ls were taken to be 10 turns each, the angle A was 60 degrees, the circumferential offset C was taken to be 90 degrees, and other parameters were the same as for the first calculation. The resulting stress calculated for the adhesive was below its yield stress, meaning that the fiber pack would be far more resistant to splitting during thermal cycling of the optical fiber canister. These and other calculations indicate that the canisters wound according to the invention have improvements in thermal stability of a factor of 100 or more as compared with conventionally wound canisters.

The winding design can be varied as necessary with other constraints in mind, while still obtaining the benefits of the invention. For example, smaller angles A can be used to reduce the stress on the optical fiber, resulting in less optical loss. Larger angles A may be useful if, in the future, "bend insensitive" optical fibers are developed.

Thus, the present invention provides an important improvement in optical fiber canisters, by changing the winding configuration of the optical fiber. Although a particular embodiment of the invention has been described in detail for purposes of illustration, various modifications may be made without departing from the spirit and scope of the invention. Accordingly, the invention is not to be limited except as by the appended claims.

What is claimed is:

1. An optical fiber canister, comprising a bobbin having an optical fiber wound in a plurality of layers thereupon, the optical fiber layers including
   a first layer comprising a plurality of spaced-apart helical wound segments, with each pair of helical wound segments being separated by a stepforward wound segment; and
   a second layer overlying the first layer, the second layer comprising a plurality of spaced-apart helical wound segments, with each pair of helical wound segments being separated by a stepforward wound segment,
   the first and second layers being wound such that the stepforward wound segments of the second layer overlie the helical wound segments of the first layer, and the helical wound segments of the second layer overlie the stepforward wound segments of the first layer.

2. The canister of claim 1, wherein each stepforward wound segment of the first layer is circumferentially offset from its two adjacent stepforward wound segments.

3. The canister of claim 2, wherein the circumferential offset is at least 90 degrees around the circumference of the bobbin.

4. The canister of claim 1, wherein the bobbin has a central axis, and wherein each stepforward wound segment of the first layer is wound at an angle of from about 30 to about 60 degrees from the axis of the bobbin.

5. The canister of claim 1, wherein the bobbin has a central axis, and wherein the axial length of each stepforward wound segment of the first layer is substantially the same as the axial length of each helical wound segment.

6. The canister of claim 1, wherein the optical fiber layers further comprise
   a base layer wound directly onto the bobbin, the base layer being wound in a helical pattern along its entire length.

7. The canister of claim 1, further comprising
   a base layer wound directly onto the bobbin, the base layer being wound in a helical pattern along its entire length and being made of a material other than the optical fiber.

8. The canister of claim 1, wherein the bobbin is conical in shape, with a conical angle of less than about 5 degrees.

9. The canister of claim 1, wherein the bobbin is cylindrical in shape.

10. An optical fiber canister, comprising a bobbin having a central axis and having an optical fiber wound in a plurality of layers thereupon, the optical fiber layers including
    a first layer comprising a plurality of spaced-apart helical wound segments, with each pair of helical wound segments being separated by a stepforward wound segment,
    wherein each stepforward wound segment is circumferentially offset from its two adjacent stepforward wound segments, and wherein each stepforward wound segment of the first layer is wound at an angle of from about 30 to about 60 degrees from the axis of the bobbin; and
    a second layer overlying the first layer, the second layer comprising a plurality of spaced-apart helical wound segments, with each pair of helical wound segments being separated by a stepforward wound segment, the first and second layers being wound such that the stepforward wound segments of the second layer overlie the helical wound segments of the first layer, and the helical wound segments of the second layer overlie the stepforward wound segments of the first layer.

11. The canister of claim 10, wherein the circumferential offset is at least 90 degrees around the circumference of the bobbin.

12. The canister of claim 10, wherein the axial length of each stepforward wound segment of the first layer is substantially the same as the axial length of each helical wound segment.

13. The canister of claim 10, wherein the optical fiber layers further comprises
    a base layer wound directly onto the bobbin, the base layer being wound in a helical pattern along its entire length.

14. The canister of claim 10, further comprising
    a base layer wound directly onto the bobbin, the base layer being wound in a helical pattern along its entire length and being made of a material other than the optical fiber.

15. The canister of claim 10, wherein the bobbin is conical in shape, with a conical angle of less than about 5 degrees.

16. The canister of claim 10, wherein the bobbin is cylindrical in shape.

17. A method of preparing an optical fiber canister, comprising the steps of:
    furnishing a bobbin having at least one underlying layer of optical fiber wound thereupon;
    winding a first layer overlying the underlying layer of optical fiber, the first layer comprising a plurality of spaced-apart helical wound segments, with each pair of helical wound segments being separated by a stepforward wound segment; and
    winding a second layer overlying the first layer, the second layer comprising a plurality of spaced-apart helical wound segments, with each pair of helical wound segments being separated by a stepforward wound segment,
    the first and second layers being wound such that the stepforward wound segments of the second layer overlie the helical wound segments of the first layer, and the helical wound segments of the second layer overlie the stepforward wound segments of the first layer.

* * * * *